United States Patent [19]

Koike et al.

[11] Patent Number: 5,064,033
[45] Date of Patent: Nov. 12, 1991

[54] ROTARY DAMPER

[75] Inventors: Yasuo Koike, Tokyo; Kikuo Nakamura, Chiba, both of Japan

[73] Assignee: Enidine Co., Ltd., Japan

[21] Appl. No.: 668,736

[22] Filed: Mar. 13, 1991

Related U.S. Application Data

[63] Continuation of Ser. No. 391,150, Aug. 8, 1989, abandoned.

[51] Int. Cl.$^5$ .............................. F16F 9/14; E05F 3/22
[52] U.S. Cl. ...................................... 188/306; 188/287; 16/58; 16/82
[58] Field of Search ................. 16/58, 84, DIG. 9, 82; 188/306, 287

[56] References Cited

U.S. PATENT DOCUMENTS

| | | | |
|---|---|---|---|
| 1,449,652 | 3/1923 | Capra | 16/58 |
| 1,548,501 | 8/1925 | Arnold | 16/58 |
| 1,578,976 | 3/1926 | Fowble | 16/58 |
| 4,098,597 | 7/1978 | Nebuling | 188/306 |

Primary Examiner—Robert L. Spruill
Assistant Examiner—Carmine Cuda
Attorney, Agent, or Firm—Eckert Seamans Cherin & Mellott

[57] ABSTRACT

A rotary damper is disclosed having a hollow casing and a power receiving shaft extending exteriorly of the casing. The power receiving shaft turns a movable vane within the casing to pressurize a working fluid. A stationary partition member including a dividing wall and a dividing vane is positioned within the casing and journals the movable vane for rotation within the casing. The movable vane is provided with a through hole equipped with a one-way valve and the dividing wall is provided with a plurality of arcuately spaced orifices. The orifices are positioned to be serially covered by the movable vane as it is rotated to thereby provide increased resistance to fluid flow as the movable vane is further rotated.

8 Claims, 4 Drawing Sheets

ROTARY DAMPER

This is a continuation of application Ser. No. 391,150 filed Aug. 8, 1989 now abandoned.

BACKGROUND OF THE INVENTION

1. Field of the Invention

The present invention relates generally to a rotary damper or rotary snubber for braking a body of rotation, and more particularly, relates to a rotary damper which can prevent the generation of a large impact and sound on the occasion of opening and shutting a cover or a door or the like by installing the device on the cover or door of a piece of mechanical apparatus.

2. Description of the Prior Art

Hitherto, the opening and shutting of a cover or a door of a piece of mechanical apparatus functioned by rotating and moving a body of rotation reciprocatively within a fixed angular range.

In the case where the closure of a vertical opening is rotated and moved in the vertically downward direction and the closing is performed by a free fall, the kinetic energy of the closure is increased as the distance from the axis of rotation to the center of gravity of the closure increases. Therefore, the potential for a large impact will be generated by the time the closure completely covers the opening. Accordingly, a mechanism for braking the rotary power of the closure has been developed by prior workers in the art wherein a rotary damper has been arranged at the rotary axis of the closure in order to absorb this impact.

One such prior art rotary damper is disclosed and described in U.S. Pat. No. 4,098,597. In this device, since an inner tube through which many holes are bored in the surrounding wall must be constructed in the inside of an outer tube in order to form an accurate gap in a concentric circle between both of the tubes, there are inherent design problems including a multiplicity of parts, complexity in construction, difficulty in fabrication, many obstacles, expensive cost and the like.

Another example of a prior art rotary damper construction is illustrated in FIG. 7. Plural vanes or disks 2 or the like are received in the casing 1 and the shaft of rotation 3 is connected with the said vanes 2 integrally, so that the vanes 2 are rotated when the shaft 3 rotates. Working oil 4 fills all cavities within the said casing 1, and when the vanes 2 are rotated by transmitting the rotary power of the above-mentioned closure to the shaft of rotation 3, a rotary damper will be constituted. The structure generates a braking force by the viscous resistance of the working oil 4 as it is stirred by the rotary action of the vanes 2 within the casing 1.

But, the prior art rotary damper of FIG. 7 is a device in which only a fixed braking torque is given to the rotating member, and the effect of the rotary damper could not be altered to compensate for the change in torque caused by the position of the closure as the closure is vertically moved. That is to say, the torque constant of the rotary damper is established to a set value of the closure time of the closure. When a free fall is performed from an upper state by releasing the closure, the closure will stop halfway because of the fact that the torque at this time will be smaller in the closure than the torque in the rotary damper. The torque value of the rotary damper is set to a smaller value than the torque at the closure when the closure is dropped freely. Accordingly, the said prior art rotary damper cannot brake the rotary energy during the entire closure time of the cover, and there may arise a considerable generated impact upon complete closure.

SUMMARY OF THE INVENTION

The present invention presents a technique by which the said customary problems are fundamentally solved and provides a rotary damper which is capable of increasing productivity by simplifying the construction together with the fact that the entire constitution is simplified by decreasing the number of the constitutive parts.

The description of the main constitution of the rotary damper in accordance with the present invention is as follows:

The present rotary damper is characterized in that is constituted by a receiving member within which a vacant chamber is arranged; a stationary partition member which as well as a dividing wall for dividing the vacant chamber of the said receiving member into a fluid chamber and a communicating chamber is arranged, a dividing vane for dividing a fluid chamber is arranged and a through hole for communicating a fluid chamber and a communicating chamber in the said dividing wall is formed; a stationary member for securing the said stationary partition member in the receiving member; a movable partition member within which a movable vane for dividing the said fluid chamber into plural fluid chambers is arranged in company with a dividing vane which is received in the fluid chamber and is arranged to the said stationary partition member; a transmitting member for transmitting a rotary power from the outside to the said movable partition member; and a working fluid having non-compressibility for filling up in the said fluid chamber and a communicating chamber.

Also, the said rotary damper is characterized by forming integrally the said stationary partition member and stationary member and further is characterized by forming integrally the said movable partition member and the transmitting member.

Further, the said rotary damper is characterized by forming a aperture in the said movable vane or a dividing vane and by a valve spindle for controlling the flow of a working fluid having non-compressibility in only one direction in the said aperture.

Since, in the rotary damper in accordance with the present invention, the stationary partition member for dividing the vacant chamber formed in the receiving member into the fluid chamber and the communicating member is received and secured as mentioned above, a working fluid having non-compressibility is received in the said fluid chamber in company with a movable partition member rotating and moving by transmitting the outside rotary power by means of a transmitting member is received, the working fluid in the fluid chamber is caused to flow into the communicating chamber through a through hole which is formed to the dividing wall of the stationary partition member when the movable partition member is rotated and moved by the rotary power from the outside. An inflow resistance at the time which the said working fluid passes through the through hole acts a braking force against the rotary power.

Also, it is possible that the number of parts is decreased by forming integrally the stationary partition member and the stationary member. Further, if the transmitting member and the movable partition member are formed integrally, it is possible that the number of parts can be additionally decreased.

Further, the aperture is formed with a movable vane or a dividing vane and the valve spindle for flowing the working fluid through the said through hole in only one direction is inserted, and therefore it is possible that the braking force is generated in only the case when the movable partition member is rotated in the one direction.

DESCRIPTION OF THE PREFERRED EMBODIMENTS OF THE INVENTION

The explanation with reference to the accompanying drawings of the operative example of the rotary damper in accordance with the present invention is as follows:

FIRST EMBODIMENT

Figure 1:
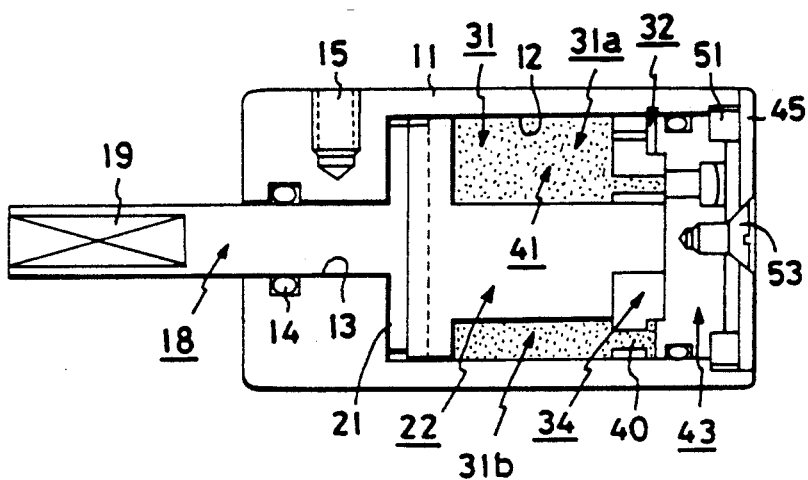
FIG. 1 is a cross sectional view in the axial direction of the rotary damper in accordance with the first operative example of the present invention.
Figure 2:
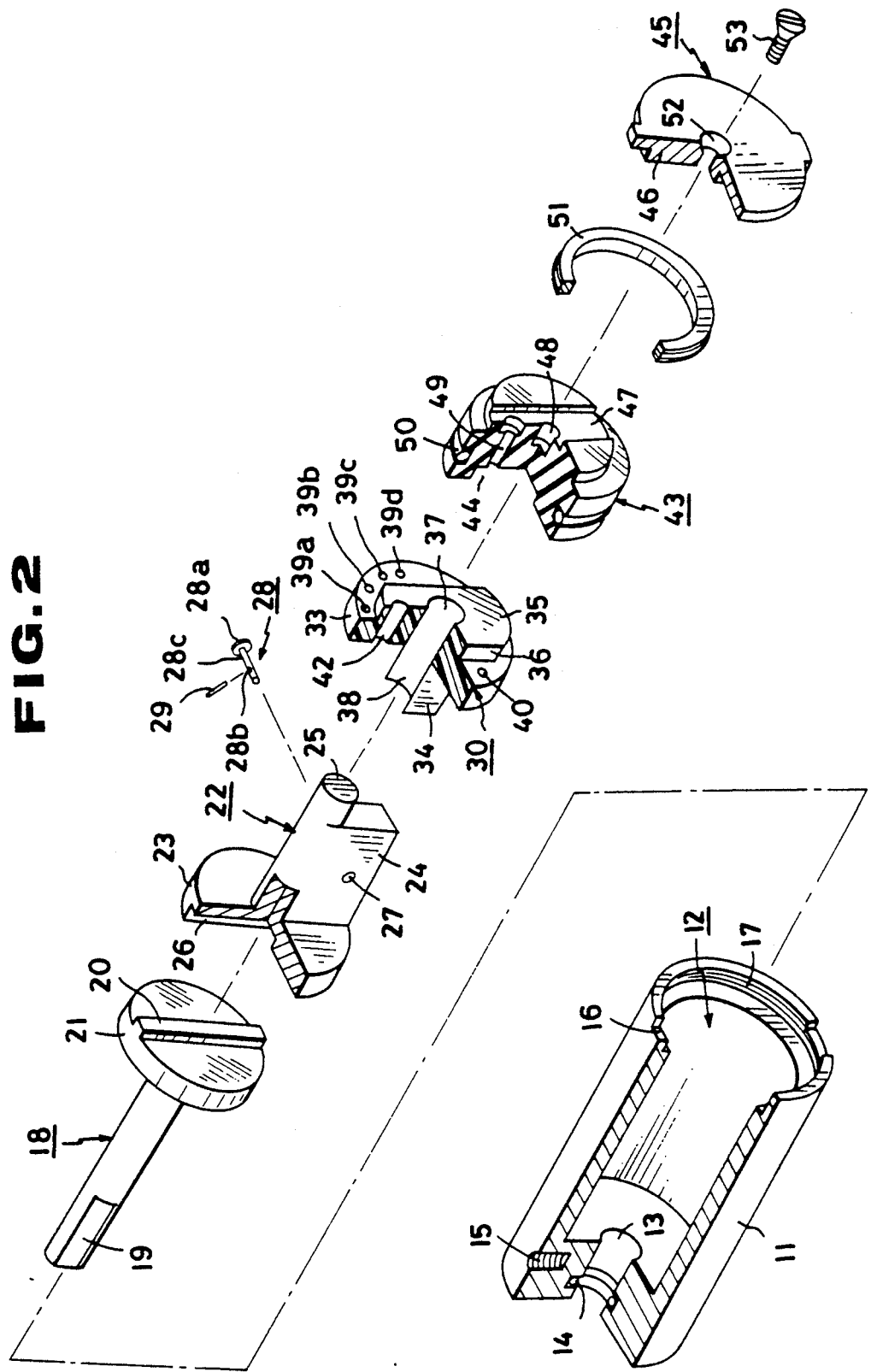
FIG. 2 is an exploded perspective view showing the component parts.

Referring now to FIGS. 1 and 2, first a vacant chamber 12 is formed from one end in the inside of the casing 11 which results in a receiving member. An axial receiving hole 13 for inserting a transmitting member is formed from the other end of the casing 11 in communication with the chamber 12. An 0-ring gasket 14 for preventing leakage of the non-compressible working fluid 41 fills the vacant chamber 12 is provided at the said axial receiving hole 13. An installing hole 15 for installing the rotary damper is formed with the body frame (not shown) in the outer surrounding portion of the casing 11. A groove 16 for inserting and installing a cap 45 and a screw thread 17 for threadedly combining a ring screw 51 are formed in the releasing end of the vacant chamber 12.

A shaft 18 which forms a part of the transmitting member is inserted through the axial receiving hole 13 of the casing 11, and is employed for transmitting the rotary power of the body of rotation (not shown) to the movable partition member 22.

The flat breadth portion 19 is provided to operatively receive the transmitting mechanism (not shown) including a coupling, a gear or a pulley and the like at the end of the shaft 18. A flange 21 in which a diametrical projection 20 is formed connects to the other end of the said shaft 18. This projection 20 transmits rotary power by engaging within the groove 26 which is formed in the said movable partition member 22.

The movable partition member 22 is received in the fluid chamber 31 which is formed by dividing the vacant chamber 12 by means of the stationary partition member 30 and is rotated and moved by the outer rotary power transmitted by means of the said shaft 18. The movable partition member transmits the said rotary power to the working fluid 41 within the fluid chamber 31.

The said movable partition member 22 comprises a flange 23 which is formed with a diameter similar to the diameter of the first vacant chamber 12, an integral movable vane 24 formed with a length similar to the length of the fluid chamber 31 and an axis portion 25.

A concave groove 26 is formed in the flange 23 opposite to the projection 20 which is formed on the flange 21 on the shaft 18, and the parts are arranged so that rotation of the shaft 18 will be transmitted to the movable partition member 22 by inserting and combining the projection 20 of the shaft 18 in the said groove 26. A aperture 27 penetrates the vane 24 and is provided in about the center of the said movable vane 24. The working fluid 41 is controlled to flow in only one direction by installing a spindle valve 28 within the aperture 27.

The said spindle valve 28 has a head 28a which is formed of a larger diameter than a diameter of the said aperture 27 in one end and includes a hole 28b for inserting a roll pin 29 in the other end. The axis portion 28c is formed with a sufficiently small diameter to readily insert into the said aperture 27.

The stationary partition member 30 is employed to divide the fluid chamber 31 into the fluid chambers 31a and 31b in cooperation with the movable vane 24 of the movable partition member 22 in company with dividing the vacant chamber 12 of the casing 11 into the fluid chamber 31 and the communicating chamber 32.

The stationary partition member 30 comprises a flange-shaped dividing wall 33 having a diameter similar approximately to the diameter of the vacant chamber 12 and a dividing vane 34 having a length sufficient to project into the fluid chamber 31. The vane 34 is formed from one side of the dividing wall 33 and the projection 35 which defines the communicating chamber 32 together with the stationary member 43 is formed at the other side of the dividing wall 33.

The said projection 35 is formed with the parallel faced portion 36 in which the disc-shaped projection is planed off to form the two parallel faces, and the said parallel faced portion 36 is constructed so that the stationary partition member 30 can be secured in fixed position by engaging the projection 35 with the concave portion 44 which is formed in the stationary member 43.

An axially aligned hole 37 for receiving the shaft 25 of the movable partition member 22 is bored and arranged in the center of the dividing wall 33 and the receiving portion 38 for rotation of the movable vane 24. Plural orifices 39a, 39b, 39c and 39d and a through hole 40 having a larger diameter than the said orifices 39a, 39b, 39c and 39d are bored and arranged in the said dividing wall 33. The fluid chambers 31a and 31b and the communicating chamber 32 are in fluid communication through the plurality of orifices 39a, 39b, 39c and 39d. The fluid chamber 31b and the communicating chamber 32 are arranged so as to be able to communicate by way of the through hole 40. A fill hole 42 for filling up the working fluid 41 is bored and arranged in the said dividing wall 33.

The stationary member 43 secures the said stationary partition member 30 in the fixed position in cooperation with the ring screw 51 and the cap 45. The said stationary member is formed to a generally disk shape having a diameter similar to the diameter of the vacant chamber 12.

In order to insert the projection 35 which is formed in the stationary partition member 30 in the side of the stationary member 43, the concave portion is formed to the same shape as the said projection 35. The depth of the said concave portion 44 is formed of a smaller size than the length of the projection 35. Therefore, when the projection 35 is inserted in this concave portion 44, a gap is formed around the projection 35, and the communicating chamber 32 is constituted by the said gap.

A threaded opening 48 is bored and tapped in the center of the back of the stationary member 43 together with a groove 47 for inserting a projection 46 which is arranged in the facing surface of the cap 45. A second fill hole 49 is bored through the stationary member 43 and arranged opposite the fill hole 42 for the working fluid 41 which is bored through the stationary partition member 30. An O-ring gasket 50 for preventing leakage of the working fluid 41 from the communicating chamber 32 is installed about the outer circumference of the stationary member 43.

For the purpose of securing the stationary partition member 30 in the vacant chamber 12, the stationary member 43 is first inserted into the chamber from the release end of the vacant chamber 12. The stationary partition member 30 is secured in the direction of the axis of the vacant chamber 12 by screwing and combining the ring screw 51 with the screw threaded portion 17 which is bored and arranged in the release end of the vacant chamber 12. The direction of the groove 16 which is formed at the end of the casing 11 is coincident with the direction of the groove 47 which is formed at the stationary member 43. Therefore, the said stationary partition member 30 is secured in the direction of the circumference by inserting and combining the projection 46 of the cap 45 in the grooves 16 and 47.

The plate screw 53 is inserted in the screw hole 52 which is arranged in the cap 45, and the stationary partition member 30 is secured in the casing 11 by turning the plate screw 53 into the threaded opening 48 formed in the stationary member 43.

To assemble the parts, the shaft 18 is inserted from the vacant chamber 12 side of the casing 11. Next, with the spindle valve 28 inserted within the aperture 27 which is arranged to the movable vane 24 of the movable partition member 22, the flange 23 is positioned within the vacant chamber opposed to the flange 21 of the shaft 18, and the projection 20 of the said flange 21 is inserted so as to enter and combine in the groove 26 of the flange 23. Next, the stationary partition member 30 is inserted into the vacant chamber 12, and the shaft 25 of the said movable partition member 22 is inserted into the axial hole 37. The stationary member 43 is then inserted into the vacant chamber 12, the projection 35 of the stationary partition member 30 is inserted and combined in the concave portion 44. Subsequently, the ring screw 51 is turned and combined in the screw thread 17 of the casing 11 and the stationary partition member 30 is axially secured in the vacant chamber 12 through the stationary member 43. The communicating chamber 32 is formed between the stationary partition member 30 and the stationary member 43.

The working fluid 41 is filled in the fluid chamber 31 and the communicating chamber 32 through the filling holes 49 and 42, and then the fill hole 49 is closed in known manner. The direction of the groove 47 of the stationary member 43 coincides with the direction of the groove 16 formed in the casing 11. The cap 45 is secured to the casing 11 by inserting and combining the projection 46 of the cap 45 in the groove 47 of the stationary member 43. The said stationary partition member 30 is secured in the direction of the circumference of the first vacant chamber 12 by combining with the stationary member 43 by means of a threaded plate screw 53.

The movable partition member 22 can not be rotated without restriction in the rotary damper which is constituted as mentioned above. The said movable partition member 22 can be rotated and moved between predetermined angular ranges (about 110 degrees in the present example) which the movable vane 24 of the movable partition member 22 and the dividing vane 34 of the stationary partition member 30 are mutually engaged. It is possible that the said angular ranges can be adjusted in response to a required value.

Figure 3:
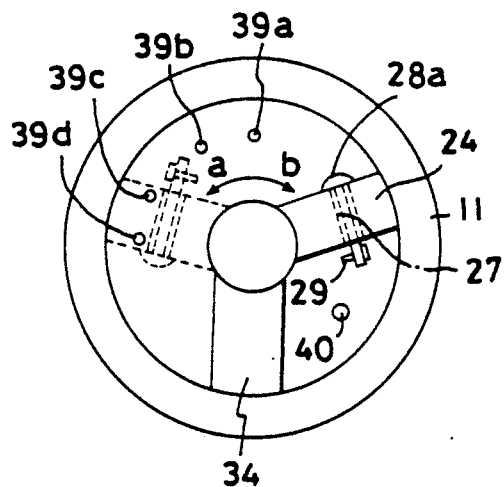
FIG. 3 is a cross sectional view in the circumferential direction.

With respect to the braking of the rotary power based on the rotary damper which is constituted as mentioned above, the fluid chamber 31 is divided and formed into the fluid chamber 31a and the fluid chamber 31b by the dividing vane 34 and the movable vane 24 as best seen in FIG. 3. When the rotary power to rotate the movable vane 24, for example, in the direction of arrow a by a body of rotation (not shown) is received, this rotary power is transmitted to the movable partition member 22 through the shaft 18, and the movable vane 24 will be rotated in the direction to the arrow a.

The working fluid 41 within the fluid chamber 31a is pressurized by the said rotation which causes portions of the working fluid to enter the communicating chamber 32 through the orifices 39a, 39b, 39c and 39d. Simultaneously, the aperture 27 will be closed by pressing the head 28a of the spindle valve 28 against the movable vane 24 by means of the said pressure. The braking force against the said rotary power will be generated by the inflow resistance to the movement of the working fluid 41 which is generated at this time.

When the rotation and movement of the movable vane 24 in the direction of the arrow a advances and the orifice 39a is closed by the said vane 24, less working fluid 41 can enter the communicating chamber 32 through the orifices 39b, 39c, 39d. Therefore, the effluent quantity of the working fluid 41 is reduced and the braking force will be consequently increased. When the movable vane 24 is rotated and moved further in the direction of the arrow a, the orifice 39b will be closed by the said movable vane 24. The quantity of working fluid 41 that can press through the orifice 39c and the orifice 39d will be further reduced and therefore the braking force will further be increased.

By closing the orifices 39a, 39b, 39c, 39d in turn accompanying with the advance of rotation and movement in the direction of the arrow a of the movable vane 24 in this manner, it is possible to increase the braking force by reducing the effluent amount of the working fluid 41 from the fluid chamber 31a to the communicating chamber 32. The working fluid 41 which flows from the fluid chamber 31a to the communicating chamber 32 will be received in the fluid chamber 31b through the hole 40.

When the rotary power of a body of rotation (not shown) rotates the movable vane 24 in the direction of the arrow b of FIG. 3, for example, pressure in the working fluid 41 in the fluid chamber 31b will be caused by the said rotation. The head 28a of the spindle valve 28 will be urged away from the surface of the movable vane 24 by operation of this pressure, and the aperture 27 will be cleared. Then the working fluid 41 can flow to the fluid chamber 31a directly through the aperture 27. At this time, a braking force in the working fluid 41 against the said rotary power will not be generated.

SECOND EMBODIMENT

Figure 4:
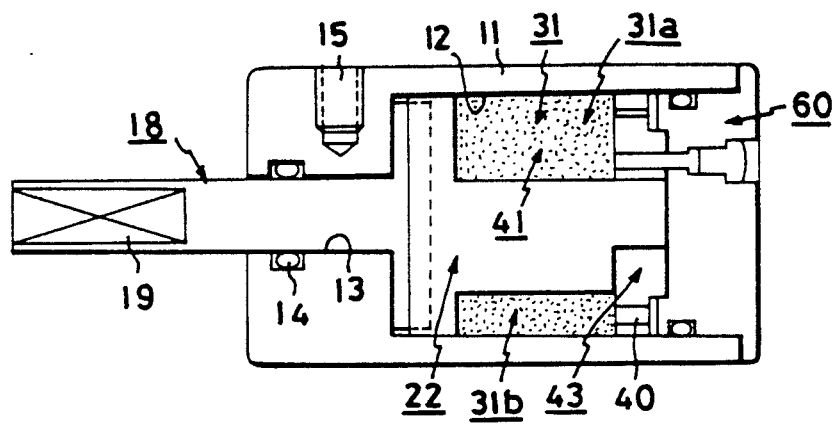
FIG. 4 is a cross sectional view of the axial direction of the rotary damper in accordance with a second embodiment of the invention.
Figure 5:
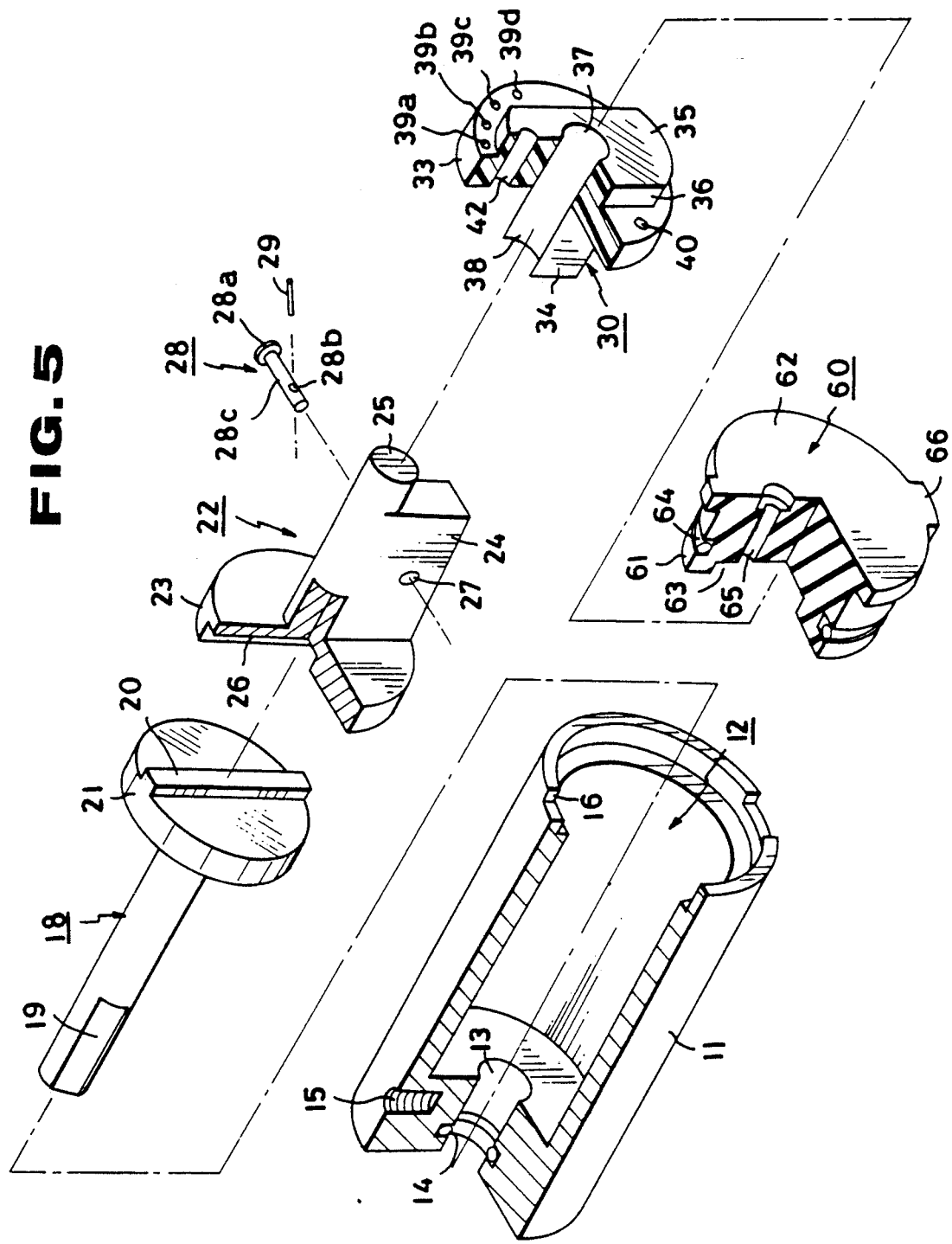
FIG. 5 is an exploded perspective view showing the component parts of the embodiment of FIG. 4.

FIG. 4 is a cross section of a second embodiment of a rotary damper in accordance with the present invention and FIG. 5 illustrates an exploded, perspective representative of the parts of FIG. 4.

With respect to construction features which are the same as illustrated and explained with regard to the first embodiment, the parts have been similarly numbered and no further explanation of their association and operation will be required.

In the second embodiment, the number of working parts has been reduced by unifying the separated stationary member, the ring screw and the cap illustrated in the said first embodiment of the invention.

As shown in FIG. 5, the groove 16 is formed at the release end of the vacant chamber 12 of the casing 11. The stationary member 60 for securing the stationary partition member 30 within the vacant chamber 12 comprises the boss portion 61 having a diameter similar to the diameter of the vacant chamber 12 and a cap portion 62.

A concave portion 63, having about the same shape as the projection 35 is formed in order to insert and combine the projection 35 of the stationary partition member 30 in the end surface of the said boss portion 61. The depth of the said concave portion 63 is formed with a smaller size than the length of the projection 36. Then, when the stationary partition member 30 and the stationary member 60 are inserted and combined, a communicating chamber 32 between both the said members will be formed. An O-ring gasket 64 for preventing a leakage of the working fluid 41 from the communicating chamber 32 is provided in the outer circumference of the boss portion 61. A fill hole 65 for filling up the working fluid 41 in the fluid chamber 31 and the communicating chamber 32 is bored and arranged in the stationary member 60. Furthermore, a projection 66 for engaging the groove 16 which is provided in the casing 11 is formed in the said cap portion 62.

For securing the stationary partition member 30 in the first vacant chamber 12 by utilizing stationary member 60, as explained in the first embodiment, the shaft 18, the movable partition member 22 and the stationary partition member 30 are inserted into the vacant chamber 12. Subsequently, the projection 35 of the said stationary partition member 30 and the concave portion 63 of the stationary member 60 are inserted and combined. The said stationary partition member 30 will be axially and circumferentially secured in the vacant chamber 12 by engaging the projection 66 of the cap portion 62 with the groove 16 of the casing 11. For securing the stationary member 60 to the casing 11, it is possible that the stationary member can be secured by using a suitable adhesive or an ultrasonic welding method, for example.

In the present operative example, it is possible that the movable partition member 22, the stationary partition member 30 and the stationary member 60 and the like can be manufactured of suitable plastics by molding or other known plastic formation technique.

THIRD EMBODIMENT

Figure 6:
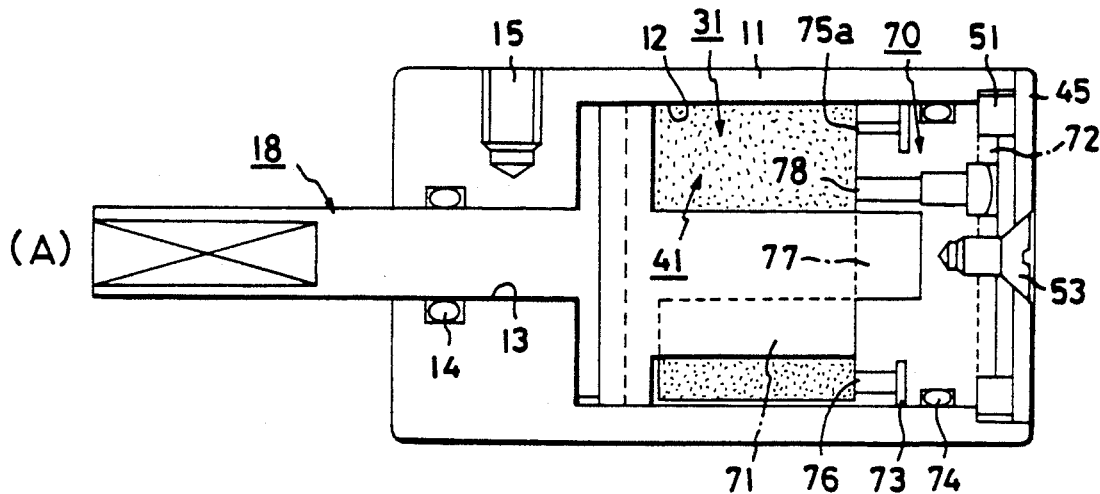
FIG. 6(a) and FIG. 6(b) are cross sectional views of the partition member in accordance with a third embodiment of the invention.
Figure 6:
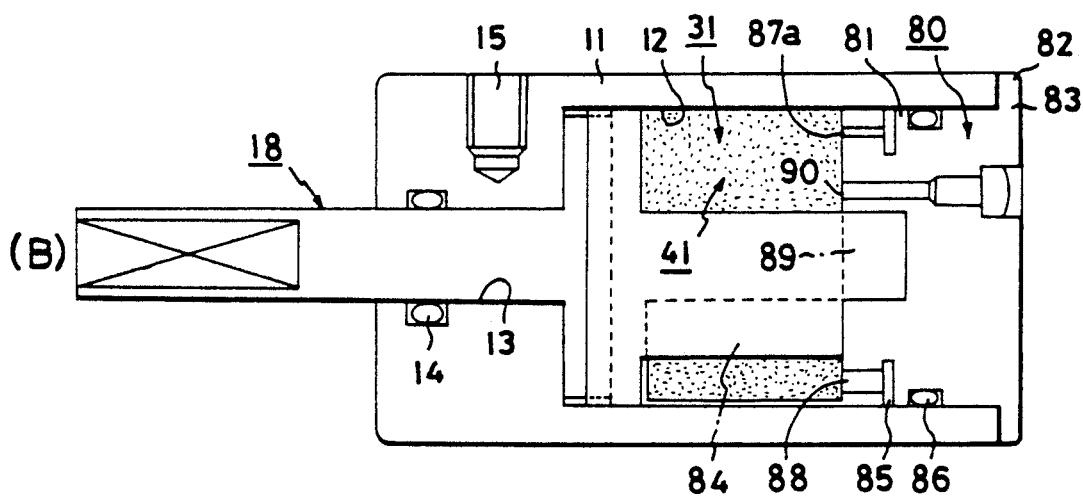
Figure 7:
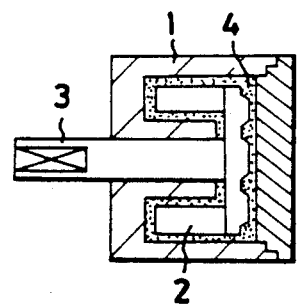
FIG. 7 is a cross sectional view showing an example of a prior art rotary damper.

FIGS. 6(a) and 6(b) are cross sectional views of the rotary damper of a third embodiment of the invention.

It is possible that the number of working parts can be reduced by forming integrally the stationary partition member and the stationary member in the present operative example.

That is to say, FIG. 6(a) illustrates a combined partition member 70 in which the stationary partition member and the stationary member of the rotary damper which is explained in the first embodiment are formed integrally. FIG. 6(b) illustrates a combined partition member 80 in which the stationary partition member and the stationary member which are explained in the second embodiment are integrally formed.

The combined partition member 70 is formed with a cylindrical shape having a diameter similar to the diameter of the vacant chamber 12. The dividing vane 71 is projected and formed in the inner end surface of the said member 70, and a groove 72 engaging the projection 46 of the cap 45 is formed at the other end. An O-ring gasket 74 for preventing leakage of the working fluid 41 from the communicating chamber 73 is provided about the outer circumference of the partition member 70. Orifices 75a, 75b, 75c and 75d and a through hole 76 for communicating with the communicating chamber 73 are bored and arranged in the surface from which the dividing vane 71 is projected and formed. An axial hole 77 for inserting the shaft 25 of the movable partition member 22 and a fill hole 78 for filling up the working fluid 41 in the fluid chamber 31 and the communicating chamber 73 are bored and arranged.

For assembling the rotary damper embodiment by using the combined partition member 70, the shaft 18 and the movable partition member 22 are inserted into the vacant chamber 12 of the casing 11. Then the combined partition member 70 is inserted, and the shaft 25 of the movable partition member 22 is inserted into the axial hole 77 of the said member 70. Subsequently, the combined partition member 70 is secured in the casing 11 by inserting and combining the projection 46 of the cap 45 in the said groove 72 and the ring screw 51 is turned and combined with the screw thread 17 of the casing 11.

The partition member 80 comprises a boss portion 81 formed with a diameter similar to the diameter of the vacant chamber 12 and an integral cap portion 83 within which the projection 82 is formed. The said projection 82 engages with the groove 16 which is formed in the casing 11. A dividing vane 84 is projected and formed on the inner surface of the said boss portion 81. A groove which results in the communicating chamber 85 is bored and arranged the outer circumference extending over the entire circumference. An O-ring gasket 86 for preventing leakage of the working fluid 41 from the communicating chamber 85 is provided to bear against the casing 11. Orifices 87a, 87b, 87c and 87d and the through hole 88 for communicating with the communicating chamber 85 are bored and arranged in the surface from which the dividing vane 84 is projected and formed together with the axial hole 89 for inserting the shaft 25 of the movable partition member 22 and the fill hole 90 for filling up the working fluid 41 in the fluid chamber 31 and the communicating chamber 85.

For assembling the rotary damper by using the combined partition member 80 which is formed as mentioned above, the shaft 18 and the movable partition member 22 are inserted into the vacant chamber 12 of the casing 11. Then the partition member 80 is inserted, and the shaft 25 of the movable partition member 22 is positioned in the axial hole 89 of the said member 80.

Subsequently, the partition member 80 can be secured in the casing 11 by inserting and combining the projection which is formed in the cap portion 83 of the said member 80 in the groove 16 of the casing 11.

In all of the embodiments mentioned above, the construction is designed to allow the working fluid 41 to flow from the fluid chamber 31b to the fluid chamber 31a in the only one direction by equipping the movable vane with the spindle valve 28 in the aperture 27 and by forming the aperture 27 in the movable vane 24. When the said aperture 27 is formed in the dividing vane of the stationary partition members 30 and 60 or the partition members 70 and 80 and a spindle valve 28 is installed within the said aperture, the same function will result.

As explained in detail above, in the rotary damper in accordance with the present invention, the vacant chamber 12 arranged in the receiving chamber is divided into a fluid chamber and a communicating chamber by the stationary partition member. The fluid chamber is divided into plural fluid chambers by the dividing vane and the movable vane. A through hole for flow of the working fluid having non-compressibility between the fluid chamber and the communicating chamber is arranged. The said movable vane applies a positive pressure to the working fluid by transmitting the rotary power of an outer body of rotation to the movable vane through the transmitting member. A braking force is generated by the resistance of the working fluid when it is excluded from the communicating chamber through the through hole by the said pressure. Further it is possible that the braking force in response to the rotary position of the movable vane is generated by forming the said plural number of through holes. Therefore, when the torque is changed by the rotary position of a body of rotation, a braking force in response to the said torque will be generated.

Further, as the groove for constituting the communicating chamber is formed in the outer circumference in place of the stationary partition member and the stationary member of the said rotary damper, it is possible that the number of parts can be lessened by using the partition member which the dividing vane is projected and formed in the inner surface. It is also possible that the number of the parts can be decreased by forming integrally the transmitting member and the movable partition member.

The aperture formed in the movable vane arranged in the movable partition member or the dividing vane arranged to the stationary partition member is equipped with a spindle valve for controlling the flow of the working fluid in the only one direction and therefore, the braking force against the rotating direction of a body of rotation is generated in the only one direction.

What is claimed is:

1. A rotary damper comprising
a receiving member within which a vacant chamber is defined;
a stationary partition member secured within the vacant chamber, the stationary partition member having a dividing wall for dividing the vacant chamber of the said receiving member into a fluid chamber and a communicating chamber, the dividing wall being provided with a through hole;
a dividing vane within the receiving member for dividing the fluid chamber, the dividing vane having first and second sides;
a stationary member positioned within the receiving member for securing the said stationary partition member in the receiving member;
a movable partition member rotatable within the receiving member, the movable partition member comprising a movable vane for dividing the said fluid chamber into first and second fluid chambers, the first fluid chamber being defined between the first side of the dividing vane and the movable vane and the second fluid chamber being defined between the second side of the dividing vane and the movable vane, the through hole being always in fluid communication between the first fluid chamber and the said communication chamber, the movable partition member having a shaft arranged for rotation within the said stationary partition member;
a transmitting member for transmitting rotary power directly from exteriorly of the rotary damper to the said movable partition member;
a non-compressible working fluid filling the said fluid chamber and the communicating chamber, the working fluid being contacted by the movable vane and being pressurized by the movable vane when the movable partition member receives the said exterior rotary power; and
a plurality of accurately spaced orifices provided in the stationary partition member, the orifices being positioned to be in fluid communication between the second fluid chamber and the said communicating chamber, the orifices being positioned to be serially covered by the movable vane as the movable partition member is rotated,
whereby said working fluid may pass from said first fluid chamber to the second fluid chamber via said through hole, said plurality of orifices and said communicating chamber.

2. The rotary damper of claim 1 wherein the movable vane is provided with an aperture, whereby said working fluid can pass through the movable vane between the said first fluid chamber and the second fluid chamber.

3. The rotary damper of claim 2 further comprising a spindle valve mounted in said aperture, the spindle valve permitting the flow of working fluid through the aperture when the movable partition member is rotated in a first direction towards the first side of the dividing vane and not permitting fluid flow through the aperture when the movable partition member is rotated in the direction towards the second side of the dividing vane.

4. A rotary damper comprising
a receiving member defining a substantially cylindrical vacant chamber there within;
a substantially disk-like stationary partition member positioned within the vacant chamber, the stationary partition member having a diameter similar to a diameter of said vacant chamber and dividing the vacant chamber axially into a fluid chamber and a communicating chamber, said fluid chamber being axially adjacent to said communicating chamber, the stationary partition member being provided with a through hole, the through hole, providing fluid communication between the fluid chamber and the communicating chamber;
a dividing vane projecting into the fluid chamber from said stationary partition member, the dividing vane comprising a bearing surface;

a movable partition member rotatable within the fluid chamber, the movable partition member comprising a movable vane for dividing the said fluid chamber into first and second fluid chambers and an integral shaft, the shaft contacting and being rotatable upon the said bearing surface;

a transmitting member extending partially exteriorly of the receiving member and having a flange portion positioned interiorly of the receiving member for directly transmitting a rotary power from the outside to the said movable partition member, the transmitting member being non-resilient and without springs;

a working fluid having non-compressibility filling the said fluid chamber and the said communicating chamber; and a plurality of accurately spaced orifices within the stationary partition member, the orifices being positioned to receive said working fluid flow therethrough, the orifices being in fluid communication between the second fluid chamber and the communicating chamber, whereby said working fluid may pass from said first fluid chamber to the second fluid chamber via said through hole, said plurality of orifices and said communicating chamber.

5. The rotary damper of claim 4 characterized in that the said movable partition member and said transmitting member are formed integrally.

6. The rotary damper of claim 4 wherein an aperture is provided in said movable vane, the aperture providing fluid communication between the first and second fluid chambers.

7. The rotary damper of claim 6 wherein a spindle valve for controlling the flow of the working fluid in the only one direction is inserted in the aperture.

8. The rotary damper of claim 7 wherein the orifices are positioned in the stationary partition member so as to be serially covered by a portion of the movable vane as the movable vane is rotated within the fluid chamber upon the application of rotary power from outside of the rotary damper.

* * * * *